Aug. 9, 1932.   J. E. BROWN   1,870,767
ARTIFICIAL BAIT
Filed Aug. 19, 1929
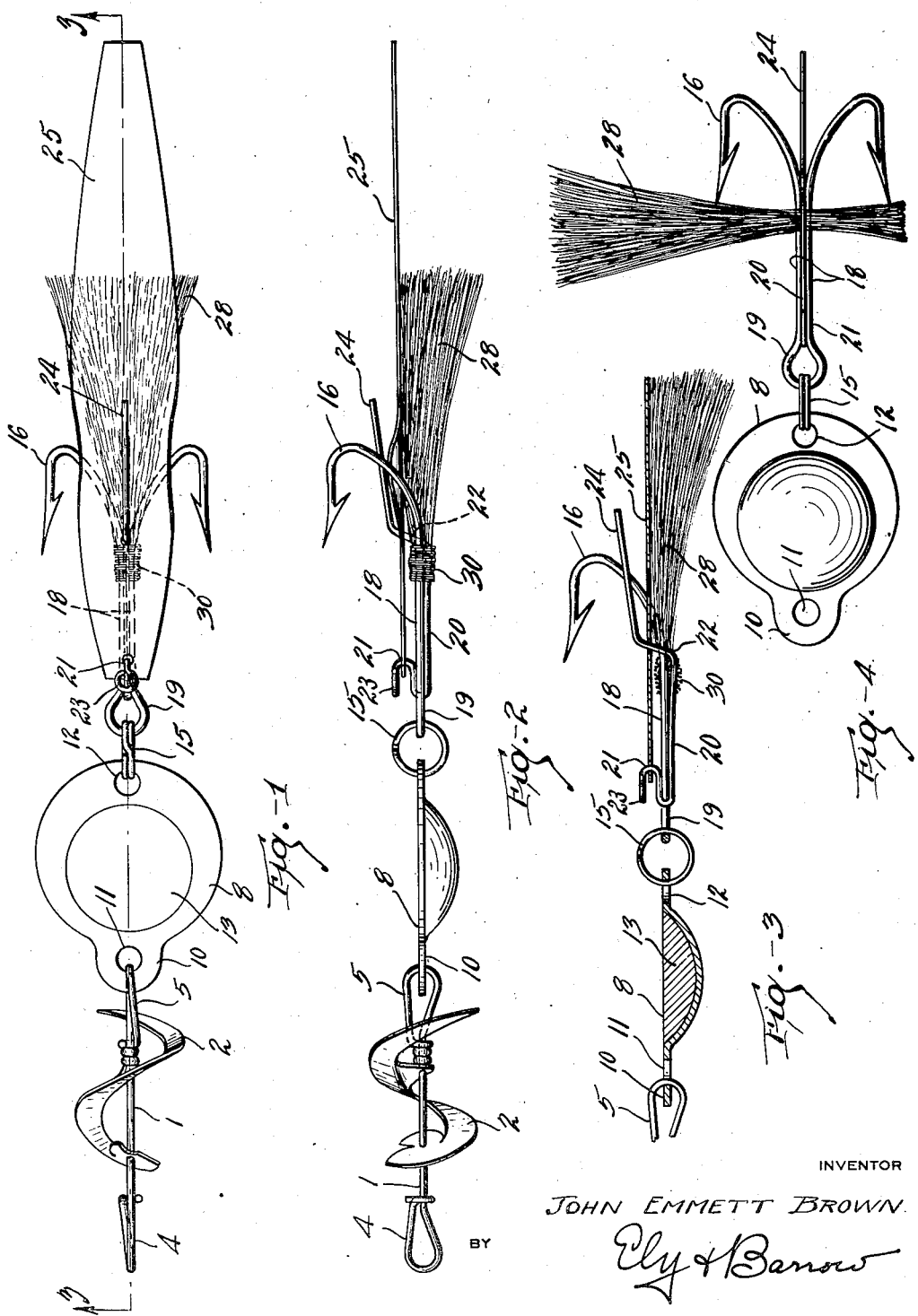
INVENTOR
JOHN EMMETT BROWN
BY
ATTORNEYS Patented Aug. 9, 1932

1,870,767

UNITED STATES PATENT OFFICE

JOHN EMMETT BROWN, OF ELYRIA, OHIO, ASSIGNOR TO THE ENTERPRISE MANUFACTURING COMPANY, OF AKRON, OHIO, A CORPORATION OF OHIO

ARTIFICIAL BAIT

Application filed August 19, 1929. Serial No. 386,858.

This invention relates to a new and improved fishing tackle or artificial bait, particularly to an assembly of various elements to constitute a very effective and efficient casting and trolling bait. One of the objects on the invention is to improve the sinker so that it will assist in accurate casting and also will improve the action of the bait during the trolling operation. The sinker is so formed and constructed that it will guide the bait in both air and water and will thus aid in both casting and trolling. The sinker is also designed and will operate to impart a very effective wobbling movement to the bait.

A further object of the invention is to improve upon the means used to attach a bucktail or similar lure to the fish hook and to combine with such means a simple and effective holder or retainer for pork rind or similar bait.

In the drawing, one form of the invention is shown, but it will be understood that the exact arrangement of the parts is not essential and may be varied or altered as conditions may dictate. It will be further understood that the details of the several parts of the invention may be varied and that exact conformity with the details of the device as shown and described is not necessary.

In the drawing,

Figure 1 is a plan view of the complete bait assembly showing the various elements thereof as they may be arranged;

Figure 2 is a side view thereof showing the position which the bait assumes in the water during trolling;

Figure 3 is a section on the line 3—3 of Figure 1;

Figure 4 is a view showing the manner of attaching the bucktail or lure to the hook by the bait holder.

The bait assembly consists of the wire leader or shaft 1 upon which is mounted a spinner or spoon 2, the type of spinner shown herein being a spiral blade having bearings upon the wire. A loop 4 at one end of the wire provides for means of attachment for the line, and a second loop 5 forms the attachment for the remainder of the bait.

As shown herein, the wire is attached directly to a sinker 8, which is formed of a sheet of metal, usually a round or substantially round disk having a projecting lug 10 with an eye 11 therein for attachment of the wire, and having a second eye 12 for attachment of the hook. The outer portion of the disk is in plane so that as the bait is cast the plane will guide the bait and will thereby facilitate direct and accurate casting. The center portion of the sinker is formed with a round recess or hollowed out portion, which is preferably formed by stamping the metal downwardly to form a breast which is filled with lead or other heavy metal 13, the surface of the lead being flush with the surface of the sinker. It will be observed that the weight or lead is placed eccentrically to the disk and that there is a considerable portion of the disk surrounding the weight. While the stamping and filling operations may be preferable for the manufacture of the sinker, it may be formed in other ways, by die casting, or by cutting from a single bar or blank.

The body of the sinker operates as a plane in the manner described for directing the throw of the bait, and it also affords a skimming plane which tends to keep the bait near the surface as it is drawn through the water. The action of the weight located beneath the plane surface of the disk and its off-center location tends to cause the bait to wobble in its passage through the water, thereby imparting a particularly effective wobble to the whole bait structure. Although the disk will tend to turn over or rotate in the water, the location of the weight beneath the plane thereof will keep the sinker with the breast downwardly in the water, and this conjoint action further increases the wobbling movement of the bait assembly. The fact that the weight or sinker rides as illustrated, keeps the points of the hook upwardly.

It will be appreciated that the sinker may be attached to other points in the bait assembly, and in any location, whether in front of or behind the hook, the wobbling motion of the sinker will affect and be imparted to the whole of the bait assembly.

It will be further observed that the circular or rounding form of the sinker will cause the bait to separate weeds or grass and the bait will pass through such obstruction instead of being entangled thereby.

Attached to the sinker by a ring or other fastener 15 is the hook 16, which as shown is of the double form having the two parallel shanks 18 forming the eye 19. Lying between the two shafts is the wire bait holder 20, one end of which is formed with the double bend or S-shaped hook 21 which is extended through the eye of the hook, the end of which may terminate in a loop or eye 23. The other end of the wire is bent upwardly to form the portion 22 which lies in the crotch of the hook, the portions 21 and 22 thus locating the bait holder. The wire is then extended rearwardly of the hook as shown at 24.

This arrangement constitutes an effective holder for pork rind or similar baits, the pork rind 25 being passed over the extension 24 and its upper end pierced by the hook 21. In this position the pork rind is held under tension between the parts 21 and 22 and is dished or cupped somewhat by the hooks.

The wire bait holder is used for securing the bucktail, feathers 28 or other lure to the hook. This is shown in Figure 4, the lure material being placed between the wire and the hook as shown. The bucktail is then wrapped as shown at 30, the wrapping operation being carried downwardly along the hook and around the hook, wire and bucktail, so that the latter projects rearwardly as shown. This constitutes a very practical and efficient means of assembling the several elements upon the hook.

The invention is subject to various modifications within the scope thereof as set forth in the claims, it being evident that changes and variations are possible without departing from the essential features of the invention.

What is claimed is:

1. A fish lure comprising a hook and a sinker connected therewith, the body of the sinker being substantially in the form of a disk, and a weight carried upon one side of the disk, the disk around the weight constituting a plane.

2. A fish lure comprising a hook and a sinker connected therewith, the body of the sinker being substantially in the form of a disk, and a weight carried upon one side of the disk and located eccentrically to the disk, the disk extending entirely around the weight and constituting a plane.

3. A fish lure comprising a hook, a bait-holder on the hook, said holder comprising a wire having a portion thereof lying along the shank of the hook, the wire being provided with a bait-holding extension in the eye of the hook and an intermediate offset portion at the bend of the hook, and a bait held between the extension and the offset portion.

4. A fish lure comprising a hook, a bait-holder on the hook, said holder comprising a wire having a portion thereof lying along the shank of the hook, a bait-holding extension in the eye of the hook, the wire being provided with an intermediate offset portion at the bend of the hook, a bait held between the extension and the offset portion, and means to hold the wire against the shank of the hook.

5. A fish lure comprising a hook, a bait-holder on the hook, said holder comprising a wire having a portion thereof lying along the shank of the hook, a bait-holding extension in the eye of the hook, the wire being provided with an intermediate offset portion at the bend of the hook, a bait held between the extension and the offset portion, and a lure located between the wire and the shank of the hook.

6. A fish lure comprising a hook, a bait-holder on the hook, said holder comprising a wire having a portion thereof lying along the shank of the hook, a bait-holding extension in the eye of the hook, the wire being provided with an intermediate offset portion at the bend of the hook, a bait held between the extension and the offset portion, a lure located between the wire and the shank of the hook, and a wrapping surrounding the wire and the shank of the hook.

7. A double fish hook having parallel shanks and an eye, a wire lying along the shanks and having a bait-holding extension in the eye of the hook, and a lure having a portion thereof between the wire and the shanks of the hook.

8. A double fish hook having parallel shanks and an eye, a wire lying along the shanks and having a bait-holding extension in the eye of the hook, a lure having a portion thereof between the wire and the shanks of the hook, and a wrapping surrounding the shanks, the wire and a portion of the lure.

9. A double fish hook having parallel shanks and an eye, a wire lying along the shanks and having a bait-holding extension in the eye of the hook, an offset portion at the bend of the hook, and a lure having a portion thereof between the wire and the shanks of the hook.

10. A double fish hook having parallel shanks and an eye, a wire lying along the shanks and having a bait-holding extension in the eye of the hook, an offset portion at the bend of the hook, a lure having a portion thereof between the wire and the shanks of the hook, and a wrapping surrounding the shanks, the wire and a portion of the lure.

11. A double fish hook having parallel shanks and an eye, a wire lying along the shanks and having a bait-holding extension in the eye of the hook, an offset portion at the bend of the hook, a lure having a portion thereof between the wire and the shanks of the hook, and a bait held between the extension and the offset portion.

12. A double fish hook having parallel shanks and an eye, a wire lying along the shanks and having a bait-holding extension in the eye of the hook, an offset portion at the bend of the hook, a lure having a portion thereof between the wire and the shanks of the hook, a wrapping surrounding the shanks, the wire and a portion of the lure, and a bait held between the extension and the offset portion.

JOHN EMMETT BROWN.